US008861536B2

(12) United States Patent
Xu et al.

(10) Patent No.: US 8,861,536 B2
(45) Date of Patent: Oct. 14, 2014

(54) METHOD AND SYSTEM FOR ACCESSING IMS DOMAIN FOR TRADITIONAL FIXED NETWORK USERS

(75) Inventors: Jinlei Xu, Shenzhen (CN); Zhen Ke, Shenzhen (CN); Meng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 439 days.

(21) Appl. No.: 13/258,327

(22) PCT Filed: Apr. 19, 2010

(86) PCT No.: PCT/CN2010/071892
§ 371 (c)(1),
(2), (4) Date: Dec. 23, 2011

(87) PCT Pub. No.: WO2010/148726
PCT Pub. Date: Dec. 29, 2010

(65) Prior Publication Data
US 2012/0093168 A1    Apr. 19, 2012

(30) Foreign Application Priority Data

Jun. 26, 2009  (CN) .......................... 2009 1 0148685

(51) Int. Cl.
| H04L 12/28 | (2006.01) |
| H04L 29/06 | (2006.01) |
| H04W 28/06 | (2009.01) |
| H04W 76/00 | (2009.01) |
| H04W 4/06 | (2009.01) |
| H04W 60/00 | (2009.01) |
| H04W 88/16 | (2009.01) |

(52) U.S. Cl.
CPC ........... *H04L 65/1016* (2013.01); *H04W 28/06* (2013.01); *H04W 76/002* (2013.01); *H04L 65/1073* (2013.01); *H04L 65/103* (2013.01); *H04W 4/06* (2013.01); *H04W 60/00* (2013.01); *A04W 74/00* (2013.01); *H04W 88/16* (2013.01)
USPC ......................................................... 370/401

(58) Field of Classification Search
None
See application file for complete search history.

(56) References Cited

U.S. PATENT DOCUMENTS

| 2006/0149812 | A1 | 7/2006 | Lin | |
| 2007/0008957 | A1* | 1/2007 | Huang | .......................... 370/352 |

(Continued)

FOREIGN PATENT DOCUMENTS

| BY | 1196 U | 5/2003 |
| CN | 1700640 A | 11/2005 |

(Continued)

OTHER PUBLICATIONS

Group registration at ISC reference point Aug. 29, 2008.

(Continued)

*Primary Examiner* — Chirag Shah
*Assistant Examiner* — Amar Persaud
(74) *Attorney, Agent, or Firm* — Oppedahl Patent Law Firm LLC

(57) ABSTRACT

The present invention discloses a method and system for traditional fixed network users accessing Internet Protocol Multimedia Subsystem (IMS) domain, both of the method and system can classify fixed network users in a same region into a group, and configure group information in an access gateway control function; when an access gateway initiates fixed network user registration to the access gateway control function, the access gateway control function initiating group registration to an interrogating call session control function according to the group to which the fixed network users belong; the interrogating call session control function interrogates to a home subscriber server about a service call session control function to which the group belongs, and the group is registered to the service call session control function. The method and system of the present invention greatly reduce the generation of register messages, increase the registration efficiency and overcome the defects that there is a long registration time delay and a great traffic when the fixed network users access IMS domain in the prior art.

12 Claims, 4 Drawing Sheets

(56) References Cited

U.S. PATENT DOCUMENTS

| | | |
|---|---|---|
| 2008/0261592 A1 | 10/2008 | Finizole E Silva |
| 2009/0296690 A1* | 12/2009 | Garcin et al. ............ 370/352 |
| 2010/0325275 A1 | 12/2010 | Van Elburg |
| 2011/0314169 A1 | 12/2011 | Van Elburg |
| 2012/0158964 A1 | 6/2012 | Van Elburg |
| 2012/0219127 A1* | 8/2012 | Lu et al. .............. 379/88.17 |
| 2013/0024575 A1* | 1/2013 | Taylor .................. 709/227 |

FOREIGN PATENT DOCUMENTS

| | | | |
|---|---|---|---|
| CN | 1882170 | A | 12/2006 |
| CN | 101114926 | A | 1/2008 |
| CN | 101212478 | A | 7/2008 |
| CN | 101610261 | A | 12/2009 |
| EP | 1944945 | A1 | 7/2008 |
| KR | 20080094523 | A | 10/2008 |
| RU | 2006109469 | A | 7/2006 |
| RU | 2283542 | C2 | 9/2006 |
| RU | 2007114891 | A | 10/2008 |
| WO | 2008101547 | A1 | 8/2008 |
| WO | 2010148726 | A1 | 12/2010 |

OTHER PUBLICATIONS

Supplementary European Search Report in European application number: 10791232.1, mailed on Nov. 7, 2012.

International Search Report in international application number: PCT/CN2010/071892, mailed on Jul. 22, 2010.

English Translation of the Written Opinion of the International Search Authority in international application number: PCT/CN2010/071892, mailed on Jul. 22, 2010.

* cited by examiner

METHOD AND SYSTEM FOR ACCESSING IMS DOMAIN FOR TRADITIONAL FIXED NETWORK USERS

TECHNICAL FIELD OF THE INVENTION

The present invention relates to the field of network access technology, in particular to a method and system for traditional fixed network users accessing an Internet Protocol Multimedia Subsystem (IMS) domain.

BACKGROUND OF THE INVENTION

An IMS is a subsystem supporting IP multimedia service, which is proposed by the Third Generation Partnership Project (3GPP) in the fifth version thereof; the IMS is mainly featured by adopting the Session Initiation Protocol (SIP) and being independent of access. Under the development trend of network convergence, the 3GPP, the European Telecommunications Standards Institute (ETSI) and the International Telecommunication Union Telecommunications Standardization Sector (ITU-T) are researching a network convergence solution based on IMS, so as to achieve a is convergence of fixed network and mobile network; the IMS is thereby regarded as the ideal target architecture of the next generation network.

The concept of the Soft Switch (SS) had been gradually developed based on IP telephony since the late 1990s, and the soft switch technology had been gradually perfected in the process of transiting from narrowband to broadband and evolving from circuit switching to packet switching of the communications network. The soft switch has large-scale applications in the Internet; and it has been clear in the industry that IMS serves as a full-service target network of future fixed-mobile convergence (FMC); the evolving from the soft switch to IMS is an inevitable trend, of which the question to be considered firstly is how to enable the traditional fixed network access devices to access an IMS domain.

A traditional access device is generally registered by adopting a collectively registering way, namely, using a registration message to represent a collective access of all fixed network users under the access device, specifically with reference to a signalling from an Access Gateway (AG) to an Access Gateway Control Function (AGCF) side in FIG. 1. In IMS domain, a registration of the AGCF to a Call Session Control Function (CSCF) server is usually initiated with a Public User Identity (PUI) to which each independent user corresponds; the call session control function comprises a Service Call Session Control Function (S-CSCF), an Interrogating Call Session Control Function (I-CSCF) and the like; the S-CSCF is in a core dominate status in IMS, and is configured to registration, session control and process, and triggering service to an application server; an I-CSCF is an entry point from an access domain to a home domain, and is mainly in charge of interrogating information of home users, and allocating S-CSCF to users and the like. In FIG. 1, the two kinds of call session control functions are not differentiated, but the SIP signalling carries PUI that each independent user corresponds to needed to be transmitted between an AGCF and a CSCF is just schematically illustrated. A large amount of register messages may be generated at the same time, which makes a great impact on network traffic as well as a long registration time delay. Besides, the number of users under an access gateway usually reaches five or six thousand; if cases such as tolerant replace happen, a maximum number of users may reach two million in theory; and if multiple access gateways simultaneously initiate registration at that time, the resulting negative effects may be more serious.

In order to solve the problem that a large amount of register messages generated when registering from the AGCF to the CSCF causes negative effects to the network, it seems that an implicit register method in related standards may be taken as a reference; in Internet, a real user corresponds to a Private User Identity (PVI); at the same time, in network, the real user has multiple identities, namely corresponds to multiple PUIs; so a user actually has a PVI and multiple PUIs associated therewith; the user implicit register method means to initiate registration with the PVI to which each independent user corresponds; thus, if a user is registered successfully, it is implied that all the user's different PUIs are registered successfully, thus there is no needed to initiate register messages of PUI one after another, so as to reduce the network traffic and registration time delay. However, an implicit register itself cannot effectively solve the problems above, for the following reasons: 1) the implicit register clearly represents different PUIs of the same PVI only, and the essence thereof is to enable different identities of the same user to be registered, however, users of a traditional H248 root fixed network represent bulk users; so they are two inconsistent concepts and the implicit register cannot be directly applied; 2) a size of an implicit set is limited, and generally, only 8-12 user identities are allowed to be registered at the same time, but there are hundreds of access gateways frequently, so the capacity of the implicit register method cannot meet an access request of a large number of fixed network users; 3) because the implicit set represents the different identities of the same user, it has the limit of 'living together and dying together'; specifically, living together means that if the PUI of a user registers to access a service, all the other PUIs of the user access the service; and if the PUI of a user reports to quit a service, inevitably, all the other PUIs of the user are triggered to quit the service.

SUMMARY OF THE INVENTION

The technical problem to be solved by the invention is to provide a method and system for traditional fixed network users accessing an IMS domain, so as to overcome defects that there is a long registration time delay and a great traffic when a fixed network user accesses IMS domain in the prior art.

In order to solve the above technical problem, the technical solution of the present invention is realized as follows:

a method for traditional fixed network users accessing IMS domain, comprises the following steps:

step 1: classifying fixed network users in a same region into a group, and configuring the group information in an access gateway control function;

step 2: when an access gateway initiates fixed network user registration to the access gateway control function, the access gateway control function initiates group registration to an interrogating call session control function according to the group to which the fixed network users belong;

step 3: the interrogating call session control function interrogates to a home subscriber server about a service call session control function to which the group belongs, and registers the group to the service call session control function.

In step 1, the group information comprises: information of the service call session control function to which a group belongs, a uniform public user identity of group users, information of group users in the group and initial filter criteria information of group users.

In step 2, the process of initiating group registration by the access gateway control function comprises:

the access gateway control function analyzes whether the fixed network users belong to the group in configured group information, if so, sending a session initiation protocol signalling which carries a group user uniform public user identity of the group to the interrogating call session control function, otherwise, registering according to a method for independent users accessing IMS domain in the current Internet.

In step 2, the process of initiating group registration by the access gateway control function comprises:

the access gateway control function firstly returns a response message to the access gateway, and then analyzes whether the fixed network users belong to the group in configured group information, if so, sending a session initiation protocol signalling which carries a group user uniform public user identity of the group to the interrogating call session control function and setting a timing resending mechanism, otherwise, registering according to a method for independent users accessing IMS domain in the current Internet.

The method further comprises:

step 4: the home subscriber server sends initial filter criteria information of all group users in the group to the service call session control function;

step 5: the service call session control function selects corresponding application servers respectively for binding according to the received initial filter criteria information.

A system for traditional fixed network users accessing an IMS domain, comprising:

an access gateway, which is configured to initiate a fixed network user registration to an access gateway control function;

an access gateway control function, which is configured to accept a group information configuration which classifies the fixed network users in a same region into a group, and initiate group registration to an interrogating call session control function according to the group to which the fixed network users belong;

the interrogating call session control function, which is configured to interrogate a home subscriber server about a service call session control function to which the group belongs, and registering the group to the service call session control function.

The service call session control function may further be configured to perform authentication to the home subscriber server so as to acquire group information of a registered group;

the home subscriber server may further be configured to provide group information for the interrogating call session control function and the service call session control function;

the system further comprises an application server, which is configured to return response when performing registration binding with a corresponding group user.

The group information comprises: information of the service call session control function to which a group belongs, a uniform public user identity of group users, information of group users in a group and initial filter criteria information of a group user.

The process of initiating group registration to an interrogating call session control function by the access gateway control function according to the group to which the fixed network users belong comprises: analyzing whether the fixed network users belong to the group in configured group information firstly, if so, sending a session initiation protocol signalling which carries group user uniform public user identity of the group to the interrogating call session control function, otherwise, registering according to the method for independent users accessing IMS domain in the current Internet.

The process of initiating group registration to an interrogating call session control function by the access gateway control function according to the group to which the fixed network users belong comprises: returning a response message to an access gateway firstly, and then analyzing whether the fixed network users belong to the group in configured group information, if so, sending a session initiation protocol signalling which carries group user uniform public user identity of the group to the interrogating call session control function and setting a timing resending mechanism, otherwise, registering according to the method for independent users accessing IMS domain in the current Internet.

With the above technical solution, the present invention at least has the following advantages:

the method and system for traditional fixed network users accessing IMS domain which are disclosed in the present invention classify the fixed network users in a same region into a group; when an access gateway initiates a fixed network users registration in a certain region to an access gateway control function, the access gateway control function initiates group registration to a call session control function for the group to which the fixed network users belong, and group user uniform public user identity of the group is carried in a session initiation protocol signalling. Thus, the present invention does not need to send the session initiation protocol signalling which carries the public user identity of user to a call session control function for each traditional fixed network user, therefore greatly reduces the generation of register messages, increases the registration efficiency and overcomes the defects that there is a long registration time delay and a great traffic when a fixed network user accesses IMS domain in the prior art. In addition, the present invention is different from the implicit register method, that is, there is no need to log out other group users from IMS domain when a single user identity in the group is logged out from IMS domain.

DETAILED DESCRIPTION OF THE INVENTION

For further describing the technical means which the present invention adopts to achieve the intended purpose, and effect thereof, a method and system for traditional fixed network users accessing IMS domain which are provided by the invention are described below with reference to the accompanying drawings and preferred embodiments in detail as fellows.

Figure 1:
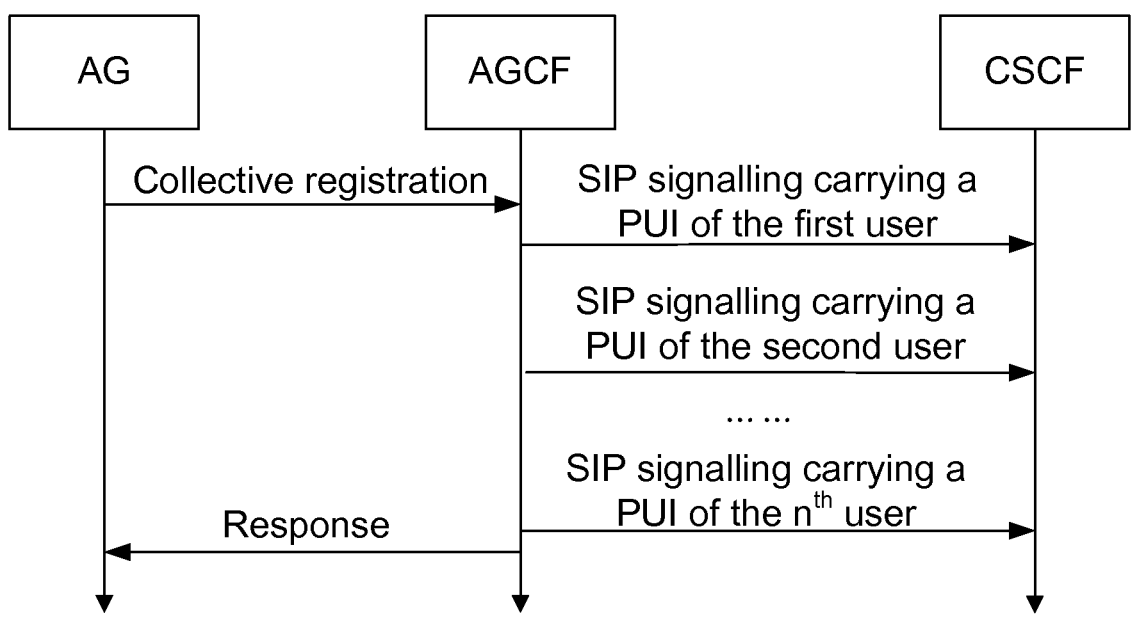
FIG. 1 shows a flowchart of collectively accessing an IMS domain for traditional fixed network users in the prior art.
Figure 2:
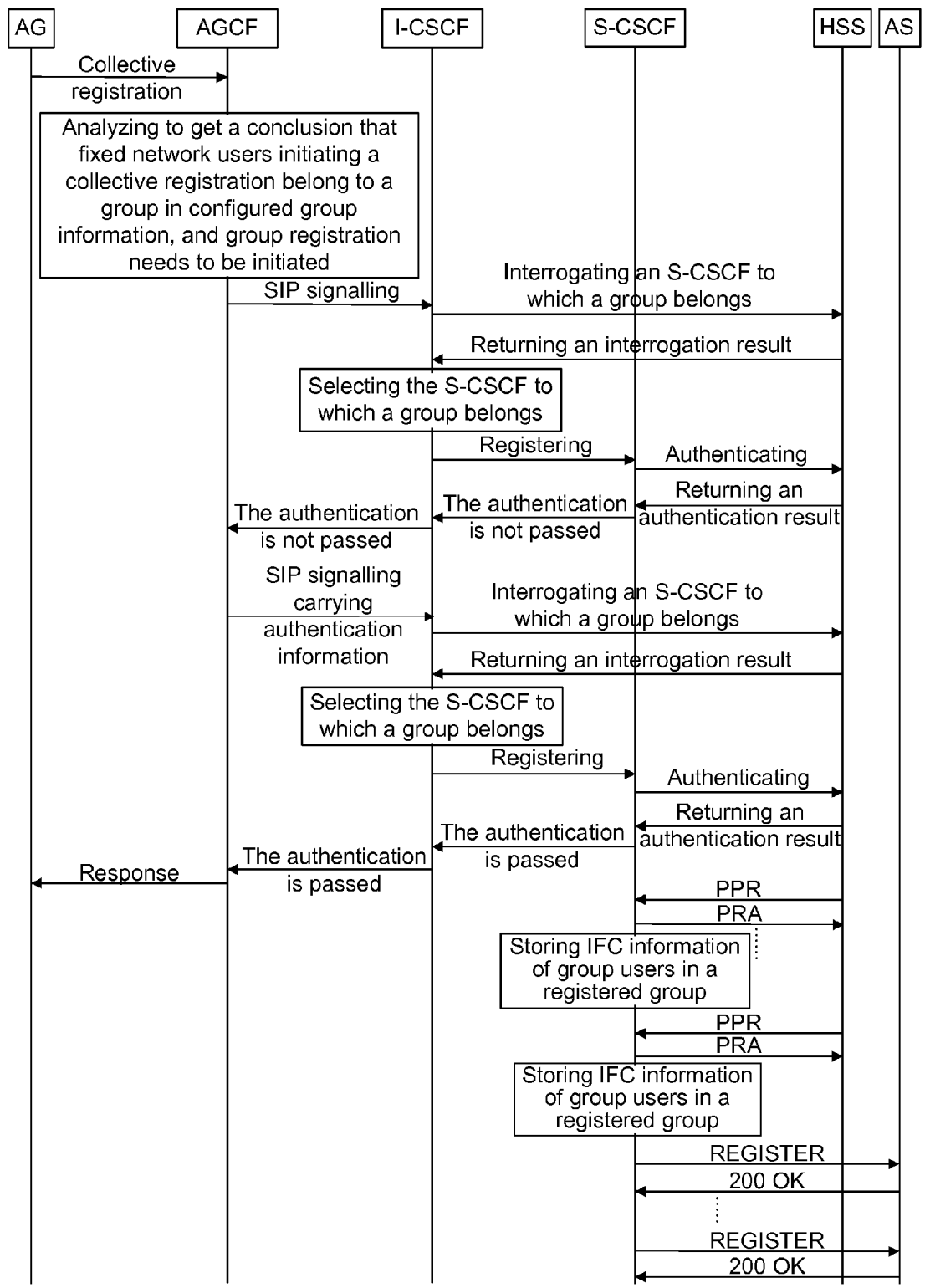
FIG. 2 shows a flowchart of a method for traditional fixed network users accessing IMS domain in the first embodiment of the present invention.

The first embodiment of the present invention is as shown in FIG. 2, a method for traditional fixed network users accessing IMS domain comprising classifying fixed network users in a same region into a group, and configuring group information in an Access Gateway (AG) control function; all the fixed network users in the region are users of the group; the group information comprises S-CSCF information to which each group belongs, a uniform PUI of group users, information of group users in each group and Initial Filter Criteria (IFC) information of each group user; the IFC information is a part of user subscriber data stored in a Home Subscriber Server (HSS). The HSS also is stores the group information; when performing actual access to fixed network users in a certain region, the method specifically comprises the following steps:

step 1: an AG initiates a collective registration request of fixed network users in a certain region to the AGCF, which means that all the users in the region under the AG need to access IMS domain;

step 2: the AGCF accepts the collective registration request sent from the AG, analyzes whether the fixed network users in the region belong to the group in configured group information, if so, sending an SIP signalling which carries a group user uniform public user identity PUI_g of the group to an I-CSCF, or else, registering according to the method in FIG. 1 for independent users accessing IMS domain in the current Internet, and then the process ends;

step 3: the I-CSCF interrogates to the HSS about the information of S-CSCF to which the I-CSCF belongs according to the group user uniform public user identity PUI_g of the group, and registers the group to the S-CSCF to which the I-CSCF belongs; for increasing the registration efficiency, the SIP signalling sent to the I-CSCF by an AGCF carries no authentication information in the prior art, so in the embodiment, it is unsuccessful for the I-CSCF to register the group to the S-CSCF to which the I-CSCF belongs at the first time; after receiving an authentication result returned by the HSS, the S-CSCF informs the I-CSCF that the authentication of this registration is unsuccessful, and then the I-CSCF informs the AGCF that the authentication of this registration is unsuccessful;

step 4: after receiving a response of the unsuccessful authentication, the AGCF adds related authentication information to the SIP signalling mentioned in step 3 and initiates the registration to the I-CSCF again;

step 5: the I-CSCF interrogates again to the HSS about the information of S-CSCF to which the I-CSCF belongs according to the group user uniform public user identity PUI_g of the group, and initiates a register message carrying an authentication information to the S-CSCF to which the I-CSCF belongs; because the authentication information is carried this time, the S-CSCF authenticates to the HSS; then the HSS returns an authentication result, the S-CSCF informs the I-CSCF that the authentication is passed through this registration, then the I-CSCF informs the AGCF that the authentication is passed through this registration, at last, the AGCF returns a response message of the collective registration request to the AG;

step 6: the HSS provides group information for the S-CSCF, specifically, downloading IFC information of group users to the S-CSCF distributed for users, and this process can be implemented through a PPR message and PRA message between the HSS and the S-CSCF;

step 7: according to the IFC information of the group users, the S-CSCF respectively selects corresponding AS to bind, and this process can be implemented through a REGISTER message and 200 OK message between the S-CSCF and the AS.

Figure 3:
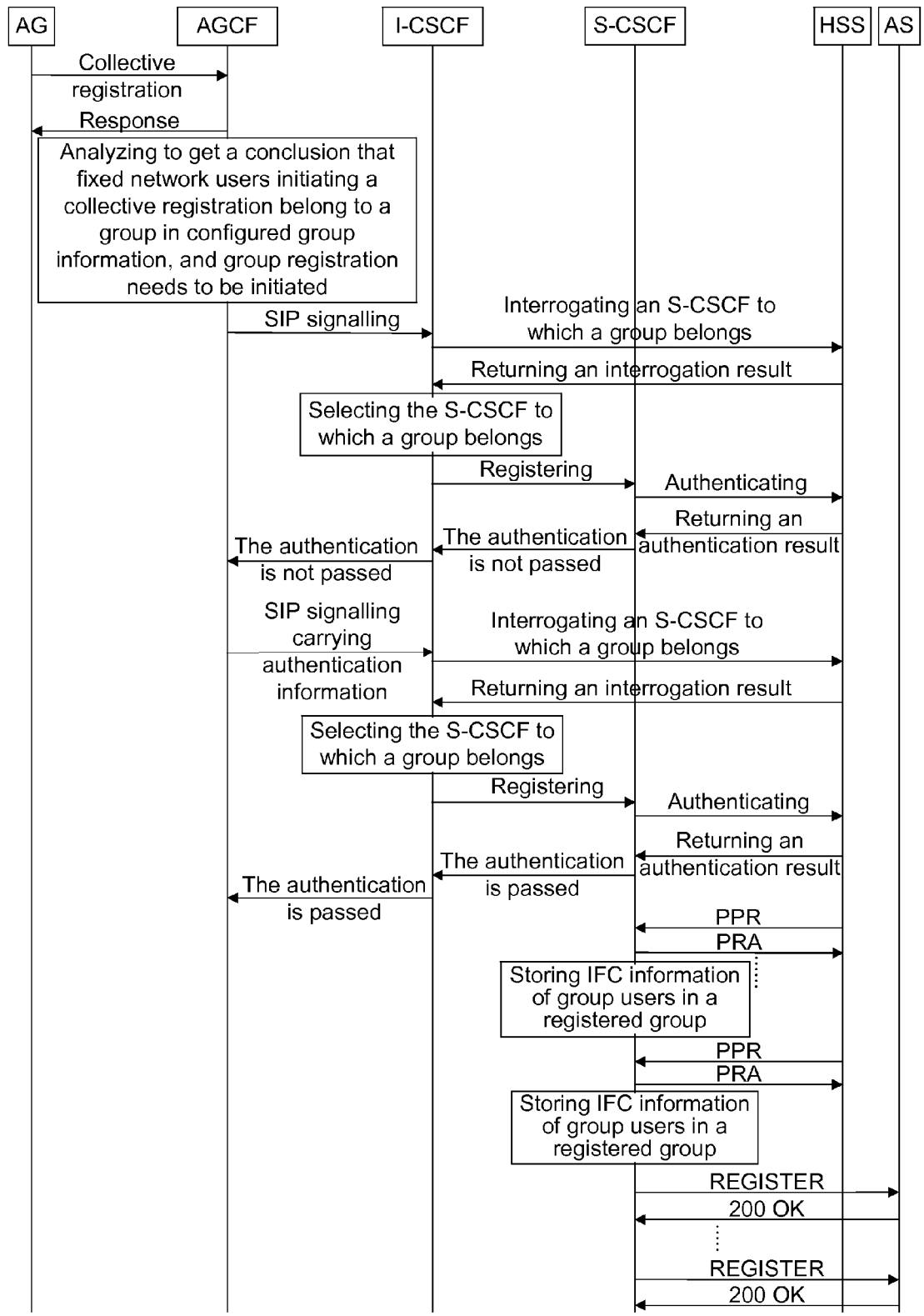
FIG. 3 shows a flowchart of a method for traditional fixed network users accessing IMS domain in the second embodiment of the present invention.

The second embodiment of the present invention is as shown in FIG. 3, the steps of a method for traditional fixed network users accessing IMS domain are roughly the same as that of the method described in the first embodiment, the difference is that: in step 2, after accepting the collective registration request sent from the AG, and before analyzing whether the fixed network users in said certain region belong to the group in configured group information, the AGCF returns a response message to the AG immediately; wherein the effect that the AGCF returns a response message to the AG immediately is that: on the one hand, it means the AGCF accepts the collective registration request from the AG, on the other hand, because the subsequent registration process initiated by the AGCF to the CSCF is a bit complicated and takes a relatively long time, if the response message is returned until all the registrations are completed, the response message may not be returned after all the registrations are completed as an abnormal return response occurs, causing the AG to send the collective registration request to the AGCF again or for many times as the AG thinks it is unable to access.

For ensuring the AGCF to initiate a registration request to the I-CSCF, even though the SIP signalling initiated by the AGCF to the I-CSCF for the first time is abandoned or not responded, the embodiment sets a timing resending mechanism in the AGCF, to repeatedly initiate a register message, namely, the SIP signalling which carries the group user uniform public user identity PUI_g of the group until the response message indicating whether the authentication of the I-CSCF is passed is received.

Figure 4:
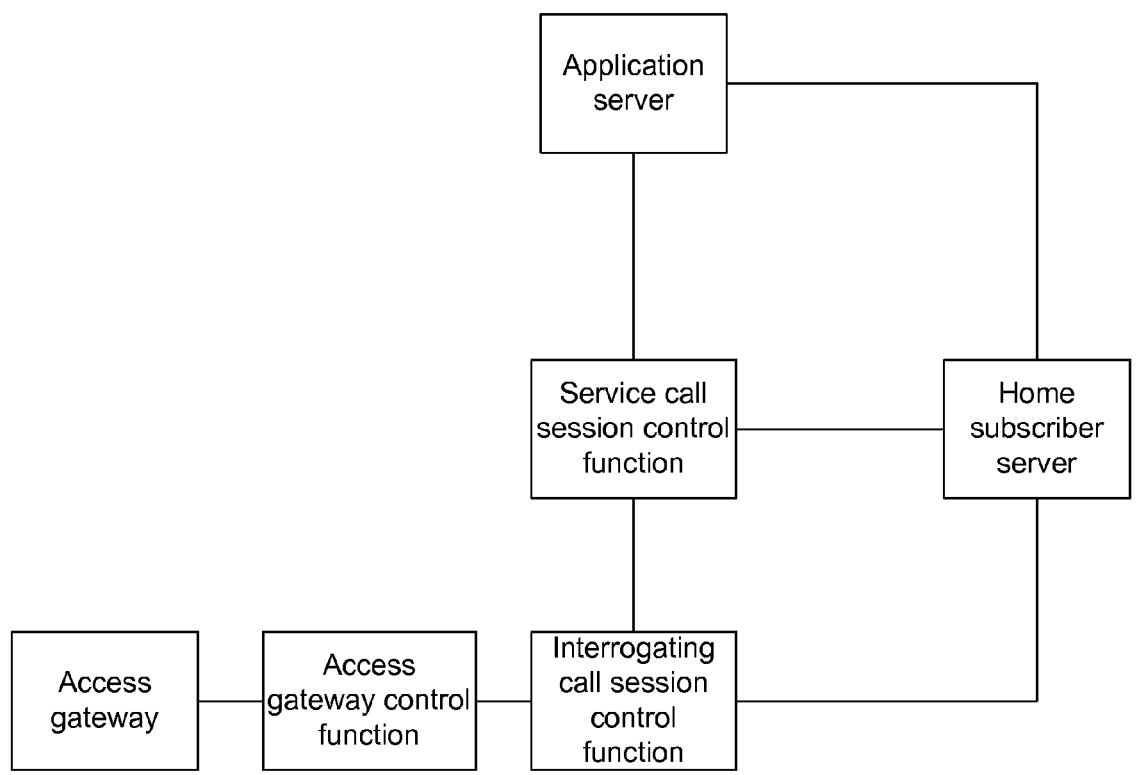
FIG. 4 shows a diagram of a system for traditional fixed network users accessing IMS domain in the third embodiment of the present invention.

The third embodiment of the present invention is as shown in FIG. 4, a system for traditional fixed network users accessing IMS domain comprises:

an access gateway, which is configured to initiate a fixed network user registration in a certain region to an access gateway control function;

the access gateway control function, which is configured to accept a group information configuration, initiate group registration to an interrogating call session control function for the group to which the fixed network users belong; all the fixed network users in the region are users of the group; the configured group information comprises information of the service call session control function to which each group belongs, a uniform public user identity of each group user, information of group users in each group and initial filter criteria information of each group user;

the process of initiating group registration to an interrogating call session control function for the group to which the fixed network users belong by the access gateway control function comprises: analyzing whether the fixed network users in the certain region belong to the group in configured group information firstly, if so, sending a session initiation protocol signalling which carries group user uniform public user identity of the group to the interrogating call session control function, otherwise, registering according to the method for independent users accessing IMS domain in the current Internet, and then the process ends;

the interrogating call session control function, which is configured to interrogate to a home subscriber server about a service call session control function to which the group belongs, and register the group to the service call session control function;

the service call session control function, which is configured to perform registration authentication from the home subscriber server to acquire group information of the registered group;

the home subscriber server, which is configured to provide group information for the interrogating call session control function and the service call session control function;

the application server, which is configured to return response when performing registration binding with corresponding group users.

The composition of a system for traditional fixed network users accessing IMS is domain of the fourth embodiment in the present invention is roughly the same as that of the system in the third embodiment, and the difference is that:

the process of initiating group registration to an interrogating call session control function for the group to which the fixed network users belong by the access gateway control function comprises: returning a response message to the access gateway firstly, and then analyzing whether the fixed network users in the certain region belong to the group in configured group information, if so, sending a session initiation protocol signalling which carries group user uniform public user identity of the group to the interrogating call session control function, otherwise, registering according to the method for independent users accessing IMS domain in the current Internet, and then the process ends.

For ensuring the access gateway control function to initiate a registration request to the interrogating call session control function, even though the SIP signalling initiated by the access gateway control function to the interrogating call session control function for the first time is abandoned or not responded, the embodiment sets a timing resending mechanism in the access gateway control function, and repeatedly initiates the register message, namely, the SIP signalling which carries the group user uniform public user identity PUI_g of the group until a response message indicating whether the authentication of the interrogating call session control function is passed is received.

Adopting the method of the present invention can effectively solve the problems of long registration time delay and large traffic, which are caused by the collective registration of traditional fixed network users, for example, access gateway users with protocols such as H.248, MGCP, SIP, H323 and the like. In case that the configuration among the AGCF, I-CSCF and S-CSCF is identical, the I-CSCF and S-CSCF can acquire the group information to which a PUI-g corresponds through the HSS, so as to realize registration of the group users. At the same time, the PUI-g is different from the implicit register in IMS, which is a contrary and abstract uniform public user identity. When a certain independent PUI under the PUI_g subsequently initiates registration and logout, other users under the group do not live together and die together any more.

Through the description of specific implementation way, the technical means which is the present invention adopts to achieve the intended purpose, and effect thereof can be known better and specifically; however, the accompanying drawings are provided only for reference and description, and not intended to limit the present invention.

The invention claimed is:

1. A method for traditional fixed network users accessing an Internet Protocol Multimedia Subsystem (IMS) domain, comprising the following steps:
   step 1: classifying fixed network users in a same region into a group, and configuring group information in an access gateway control function;
   step 2: when an access gateway initiates fixed network user registration to the access gateway control function, initiating group registration to an interrogating call session control function by the access gateway control function according to the group to which the fixed network users belong;
   step 3: interrogating to a home subscriber server about a service call session control function to which the group belongs by the interrogating call session control function, and registering the group to the service call session control function;
   wherein the group information comprises: a uniform public user identity of group users and information of group users in the group;
   wherein in step 2, the process of initiating group registration by the access gateway control function comprises: analyzing whether the fixed network users belong to the group in configured group information by the access gateway control function, if so, sending a session initiation protocol signalling which carries a group user uniform public user identity of the group to the interrogating call session control function, otherwise, registering according to a method for independent users accessing IMS domain in the current Internet.

2. The method according to claim 1, wherein, in step 1, the group information further comprises: information of the service call session control function to which a group belongs and initial filter criteria information of group users.

3. The method according to claim 2, wherein in step 2, the process of initiating group registration by the access gateway control function comprises:
   returning a response message to the access gateway by the access gateway control function firstly, and then analyzing whether the fixed network users belong to the group in configured group information, if so, sending a session initiation protocol signalling which carries a group user uniform public user identity of the group to the interrogating call session control function and setting a timing resending mechanism, otherwise, registering according to a method for independent users accessing IMS domain in the current Internet.

4. The method according to claim 3, wherein, further comprising:
   step 4: sending initial filter criteria information of all group users in the group to the service call session control function by the home subscriber server;
   step 5: selecting corresponding application servers respectively for binding according to the received initial filter criteria information by the service call session control function.

5. The method according to claim 2, wherein, further comprising:
   step 4: sending initial filter criteria information of all group users in the group to the service call session control function by the home subscriber server;
   step 5: selecting corresponding application servers respectively for binding according to the received initial filter criteria information by the service call session control function.

6. The method according to claim 1, wherein, further comprising:
   step 4: sending initial filter criteria information of all group users in the group to the service call session control function by the home subscriber server;
   step 5: selecting corresponding application servers respectively for binding according to the received initial filter criteria information by the service call session control function.

7. A system for traditional fixed network users accessing an IMS domain, comprising:
   an access gateway, which is configured to initiate a fixed network user registration to an access gateway control function;
   an access gateway control function, which is configured to accept a group information configuration which classifies fixed network users in a same region into a group, and initiate group registration to an interrogating call session control function according to the group to which the fixed network users belong;

the interrogating call session control function, which is configured to interrogate a home subscriber server about a service call session control function to which the group belongs, and register the group to the service call session control function;

wherein the group information comprises: a uniform public user identity of group users and information of group users in a group;

the process of initiating group registration to an interrogating call session control function by the access gateway control function according to the group to which the fixed network users belong comprises: analyzing whether the fixed network users belong to the group in configured group information, if so, sending a session initiation protocol signalling which carries group user uniform public user identity of the group to the interrogating call session control function, otherwise, registering according to the method for independent users accessing IMS domain in the current Internet.

8. The system according to claim 7, wherein
the service call session control function, which is further configured to perform authentication to the home subscriber server so as to acquire group information of a registered group;
the home subscriber server, which is further configured to provide group information for the interrogating call session control function and the service call session control function;
the system further comprising an application server, which is configured to return response when performing registration binding with a corresponding group user.

9. The system according to claim 8, wherein the process of initiating group registration to an interrogating call session control function by the access gateway control function according to the group to which the fixed network users belong comprises: returning a response message to an access gateway firstly, and then analyzing whether the fixed network users belong to the group in configured group information, if so, sending a session initiation protocol signalling which carries group user uniform public user identity of the group to the interrogating call session control function and setting a timing resending mechanism, otherwise, registering according to the method for independent users accessing IMS domain in the current Internet.

10. The system according to claim 7, wherein, the group information further comprises: information of the service call session control function to which a group belongs and initial filter criteria information of a group user.

11. The system according to claim 10, wherein the process of initiating group registration to an interrogating call session control function by the access gateway control function according to the group to which the fixed network users belong comprises: returning a response message to an access gateway firstly, and then analyzing whether the fixed network users belong to the group in configured group information, if so, sending a session initiation protocol signalling which carries group user uniform public user identity of the group to the interrogating call session control function and setting a timing resending mechanism, otherwise, registering according to the method for independent users accessing IMS domain in the current Internet.

12. The system according to claim 7, wherein the process of initiating group registration to an interrogating call session control function by the access gateway control function according to the group to which the fixed network users belong comprises: returning a response message to an access gateway firstly, and then analyzing whether the fixed network users belong to the group in configured group information, if so, sending a session initiation protocol signalling which carries group user uniform public user identity of the group to the interrogating call session control function and setting a timing resending mechanism, otherwise, registering according to the method for independent users accessing IMS domain in the current Internet.

* * * * *